Aug. 30, 1966    P. O'CONNOR    3,269,773

CYCLE SEATS

Filed Dec. 23, 1964

INVENTOR.
PETE O'CONNOR
BY *James B. ...*
ATTORNEY

United States Patent Office 3,269,773
Patented August 30, 1966

3,269,773
CYCLE SEATS
Pete O'Connor, New Orleans, La.
(2029 Metairie Road, Apt. B, Metairie, La.)
Filed Dec. 23, 1964, Ser. No. 420,758
1 Claim. (Cl. 297—214)

The invention relates in general to seats and more particularly to seats having back supports for cycles.

It has been the practice heretofore to provide seats without backs on various cycles such as motorcycles, bicycles, motor scooters, etc., thereby leaving the backs of cycle riders unsupported. Many cycle riders have found it necessary to wear wide belts around their waists to provide a measure of support and comfort for extended rides.

The present seats without backs provide other means for overcoming the inertia of riders in starting and the force of gravity on ascending slopes. The rider's inertia increases with the rapidity of get-away and the force of gravity with the slope of the road being traveled and has led in the past to shaping saddle-like seats with broad after parts to support the buttocks and narrow front parts for gripping between the legs of the rider. The narrowing forward conformation provides equally disposed shoulders against which the closed legs of the rider engage to help prevent him from sliding to the rear. The cycle operator can additionally hold on to the handle bar grips to overcome his relatively rearward motion, but as the cycle is controlled in part with the hands of the operator and the grips of the handle bars, control interference results. A passenger riding in tandem with the operator has to hang on to the operator to overcome his inertia to further interfere with uninhibited control of the cycle. Latterly a double tandem seat of the elongated pillion type, having the same dimensions front and rear, has been provided. A handgrip transversely bisects the pillion seat for grasping by the passenger to prevent him from being left behind in starting without interfering with the operator.

In both the above types of seats, a passenger riding behind the operator, and, necessarily in close proximity to him, has his field of vision obscured by the operator unless he happens to be substantially taller and thereby able to see over the operator's shoulders. Generally, therefore, a female passenger being generally shorter than a male operator, derives little or no visual enjoyment from her ride.

Heretofore it has also been comparatively more dangerous to cycle than to ride other vehicles, especially at night and at times of reduced visibility, because a cycle, of structural necessity, must carry its tail light lower to the ground and hence less visible than other vehicles.

It is an object of the invention to provide means for seating and supporting the back of a cycler.

It is another object of the invention to provide means for overcoming a cycler's inertia and that of a passenger on starting that tends to throw them backward relative to the cycle without using hands and legs for this purpose.

It is another object of the invention to provide seating means for a cycle passenger that will allow him to visually enjoy the ride.

It is another object of the invention to provide structure for carrying a substantially larger tail light at approximately windshield height of other vehicles and plainly visible therefrom for 180 degrees.

It is another object of the invention to provide a seat and back support integral with the rear fender of a cycle.

Other objects and a fuller understanding of the invention may be had by referring to the following description and claim, taken in conjunction with the accompanying drawings, in which:

Figure 2:
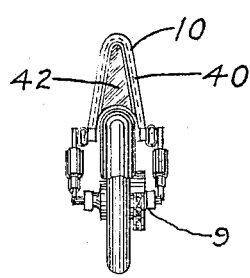
FIGURE 2 is a rear elevation of the subject matter of FIGURE 1.
Figure 1:
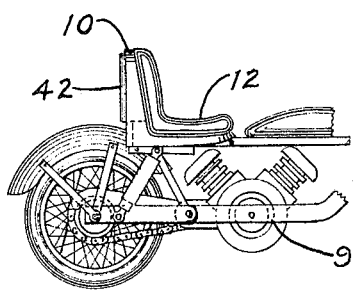
FIGURE 1 is a side view of a single seat species of the invention mounted for use on a cycle partially shown.
Figure 7:
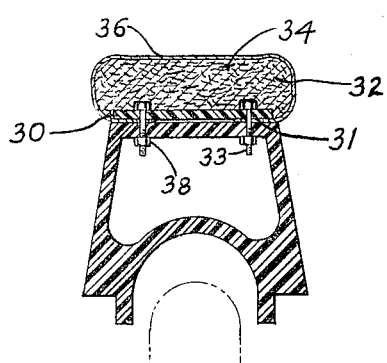
FIGURE 7 is an enlarged section thru section lines 7—7 of FIGURE 6.
Figure 3:
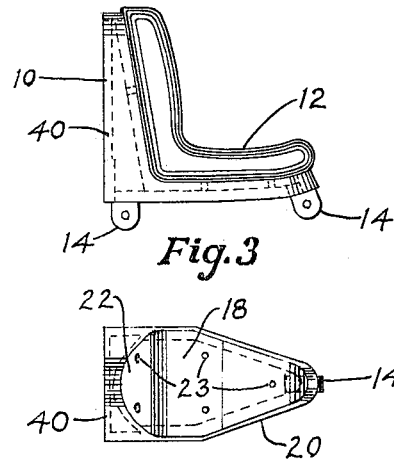
FIGURE 3 is an enlarged side view of the seat and back cushion.
Figure 6:
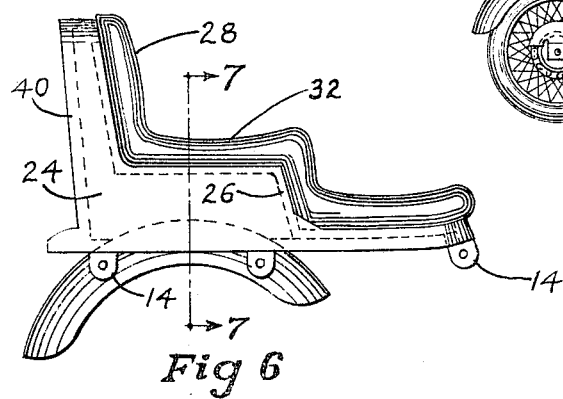
FIGURE 6 is an enlarged side view similar to FIGURE 4 showing a double seat integral with the rear fender of the cycle.

Referring to FIGURES 1 and 2, the invention is shown mounted for use on the rear part of a cycle 9, and comprising a base or frame 10 and cushion 12. Frame 10 may be moulded from any convenient material but preferably fiber glass. A mould having an interior configuration conforming to the exterior configuration of the frame 10 may be constructed of plywood or similar material. The interior of the mould may be lined with aluminum foil or similar material to facilitate removal of the moulded frame from the mould. Fiber glass cloth or felted glass fiber is smoothly and uniformly applied to the aluminum foil liner with liquid fiber glass which forms with the glass fibers a homogenous layer of fiber glass. Additional layers of fiber glass are successively applied to provide approximately ⅛" thickness. Eyelets 14 are moulded in place between the layers around the lower edges of the frame to depend downwardly, as illustrated in FIGURE 3, as the total thickness of the frame is being built up. Additional strengthening thickness around the edges of the frame may be obtained by applying thereto additional strips of fiber glass with fiber glass liquid as deemed desirable and necessary for strength. When the fiber glass has dried, the moulded frame is removed from the mould. The upper surfaces 18 are flat and outline the seat 20 and back 22. A plurality of bolt holes 23 are defined by the upper surface 18. In the double seat or base frame 24, a partial back 26 is moulded integral with operator's seat for the operator, and a second passenger seat is moulded higher than the operator's seat and integral with a full back 28 for the passenger. The rear fender may be made integral with the frame 24 as shown in FIGURES 6 and 7.

Figure 4:
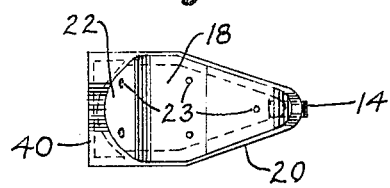
FIGURE 4 is a plan view of the frame of the single seat species.
Figure 5:
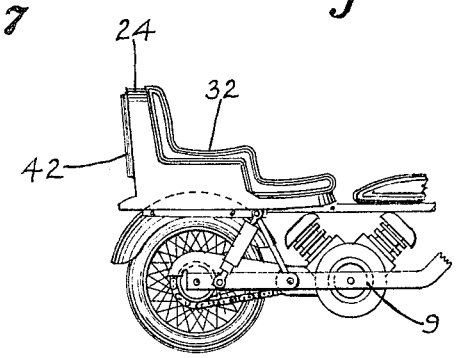
FIGURE 5 is a side view similar to FIGURE 1 showing a double seat species of the invention with integral rear fender.

An upholstering strip 30 conforming to the shape of the upper surface 18 is moulded similarly to the method employed to mould frame 10. Bolt holes 31 are defined in strip 30 conforming to holes 23 defined in the upper surfaces 18 of the frame 10. Bolts 33 are installed in holes 31 as illustrated in FIGURE 4. Cushions comprising a resilient material 34 for stuffing, such as sponge rubber, is arranged over the bolt heads and on the strip 30 and a covering 36 such as a plastic material is stretched over the stuffing and secured to the upholstering strip 30. The upholstered strip 30 with attached cushion 32 is secured to the upper surfaces 18 by the bolts 33 and nuts 38 as illustrated in FIGURE 4.

A double seat is similarly upholstered and attached to the cycle.

The frame is then secured to the frame of the cycle by means of the eyelets 14.

In both the single and the double seat species, the back edges 40, oppositely disposed from the upright portion of the flat surface 18, define an enclosed area for mounting a rear light 42 extending respectively from the tops of frames 10 and 24 to approximately a rear fender of the cycle 9. The rear light is mounted to extend rearwardly beyond the edges 40 to be visible from the rear and both sides of the cycle.

In operation the single seat and back firmly and directly supports the operator in position on the cycle however high the acceleration and inclination angle of the cycle. With the double seat, the operator is directly supported in position when riding alone by the partial back 26 and when riding with a passenger is additionally supported indirectly by the passenger who is directly supported by the full back 28.

Although we have described the invention with a certain degree of particularity, it is understood that the present disclosure has been made by way of example and that numerous changes in the details of construction and the combination and arrangement of parts may be resorted to without departing from the spirit and scope of the invention as hereinafter claimed.

I claim:

An improved tandem double seat for cycles comprising: an approximately horizontal base member having respective upper and lower surfaces, said upper surface defining tandem forward and rear seat mounts, with said rear seat mount stepped above said forward seat mount, and said lower surface defining means for mounting said base member on a cycle; an upright member, contiguous with said base member and extending upwardly from the rear thereof, said upright member having forward and rear surfaces, said forward surface defining a back rest mount for said rear seat, and said rear surface defining means for mounting a rear light above the rest of said cycle; and an upholstering strip shaped to conform to said stepped tandem seat mounts and back rest mount, one side of said strip defining means for securing said strip to said seat and back mounts and the other side being padded and upholstered.

References Cited by the Examiner

UNITED STATES PATENTS

| | | | |
|---|---|---|---|
| 1,216,029 | 2/1917 | Whitaker | 297—243 |
| 1,662,718 | 3/1928 | Regard | 297—243 X |
| 1,807,077 | 5/1931 | Van Rappelendam | 297—243 |
| 2,517,785 | 8/1950 | Goldstein | 297—243 X |
| 2,613,722 | 10/1952 | Ruppert | 297—195 X |

FOREIGN PATENTS

| | | |
|---|---|---|
| 683,628 | 12/1952 | Great Britain. |
| 708,964 | 5/1954 | Great Britain. |
| 702,574 | 1/1931 | France. |

FRANK B. SHERRY, *Primary Examiner.*

J. T. McCALL, *Assistant Examiner.*